United States Patent [19]

Doyon et al.

[11] Patent Number: 4,676,038
[45] Date of Patent: Jun. 30, 1987

[54] CABINET-MAKING

[75] Inventors: Andrea Doyon, Beauce; Denis Matte; Jacques Brosseau, both of Quebec, all of Canada

[73] Assignee: Les Industries Doyon LTEE, Beuace, Canada

[21] Appl. No.: 739,466

[22] Filed: May 29, 1985

[51] Int. Cl.[4] .............................................. F16B 3/00
[52] U.S. Cl. ..................... 52/282; 52/286; 52/586; 52/589; 403/231; 403/403
[58] Field of Search .............. 52/282, 286, 280, 582, 52/586, 589; 403/205, 231, 403

[56] References Cited

U.S. PATENT DOCUMENTS

| 3,261,493 | 7/1966 | Smith | 52/282 |
|---|---|---|---|
| 3,585,768 | 6/1971 | Klein | 52/582 |
| 3,720,027 | 3/1973 | Christensen | 52/589 |
| 3,751,127 | 8/1973 | Black, Jr. et al. | 52/282 |
| 3,783,563 | 1/1974 | Moore | 52/586 |
| 3,856,147 | 12/1974 | Piretti | 52/582 |
| 3,856,699 | 6/1975 | Bergmann, Jr. | 52/282 |
| 3,875,721 | 4/1975 | Mengeringhausen et al. | 52/282 |
| 4,068,087 | 1/1978 | Ristig | 52/584 |
| 4,126,978 | 11/1978 | Heller | 52/586 |
| 4,188,764 | 2/1980 | Gode | 52/586 |
| 4,594,829 | 6/1986 | Herrgord | 52/282 |

FOREIGN PATENT DOCUMENTS

| 953070 | 8/1974 | Canada . | |
|---|---|---|---|
| 963624 | 3/1975 | Canada . | |
| 1089620 | 11/1980 | Canada . | |
| 1110423 | 10/1981 | Canada . | |
| 2145902 | 3/1972 | Fed. Rep. of Germany | 52/582 |
| 1028791 | 3/1953 | France | 52/282 |

Primary Examiner—William F. Pate, III
Assistant Examiner—Caroline D. Dennison
Attorney, Agent, or Firm—Robic, Robic & Associates

[57] ABSTRACT

A structural member for mounting in a groove formed along a panel of a cabinet. This member has a base with a central dividing wall projecting from its top face and a pair of lateral wings converging, at 45°, from the side edges of the base, toward the central wall and terminating short of the central wall. The base, the central wall and the wings define a pair of outwardly open cavities each having a generally right angle trapezoidal contour in cross-section and extending along the base. A securing wall projects from the bottom face of the base and has tangs formed on lateral faces, these tangs being turned toward the bottom face of the base.

5 Claims, 13 Drawing Figures

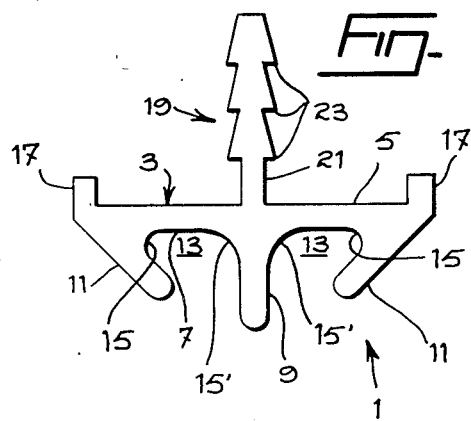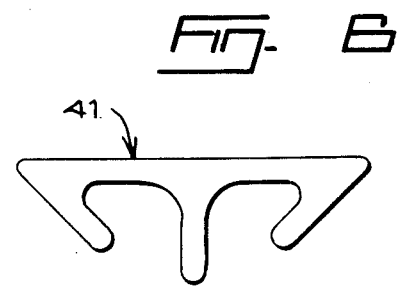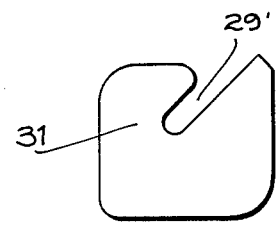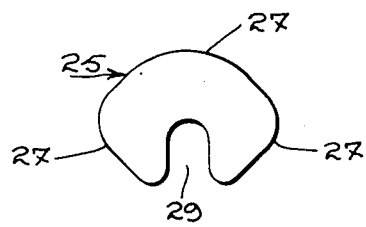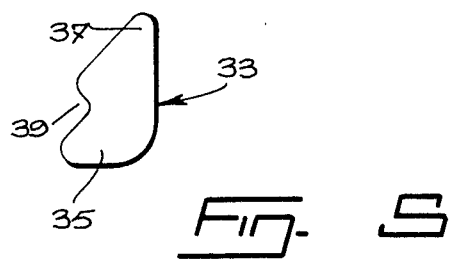

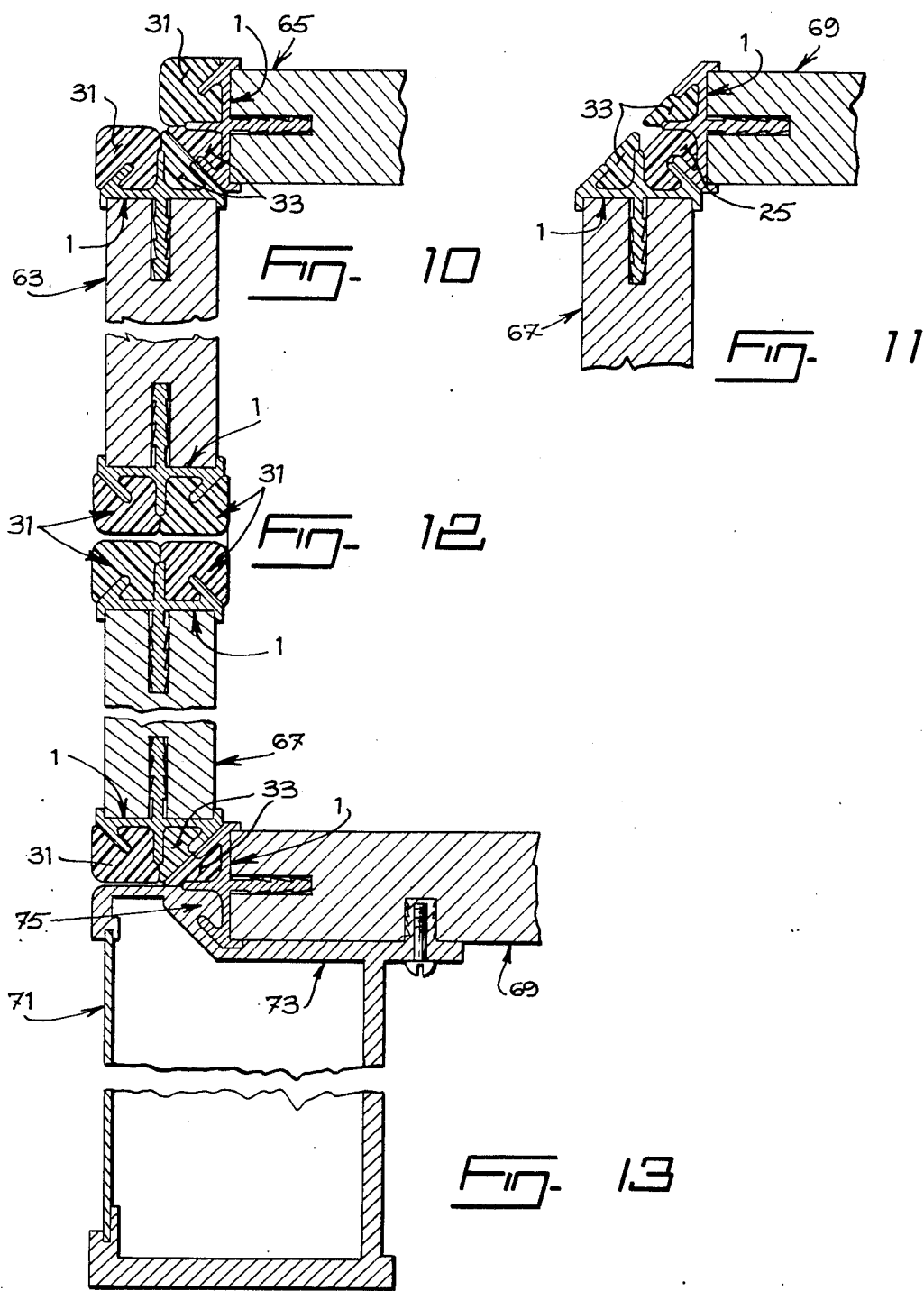

CABINET-MAKING

The present invention generally relates to cabinet-making and more specifically to assembling the panels that make up the cabinets.

The term <panel> is to be taken here to include sidewalls, top and bottom walls, shelves as well as swinging or slidable door panels for such cabinets.

A main object of the invention lies in providing a basic structural member, made of extrudable material and thus of one piece, suitable to be fixedly mounted along an edge of the cabinet panels simply by pressing a securing wall, of which such a structural member is provided, into an elongated groove of the panel.

Another object of the invention is to provide such a basic structural member configured, outwardly of the panel edge, to receive a variety of key elements suitable to have it cooperate with similarly equipped edges of other cabinet panels, either to connect adjoining panels together or provide an edge facing relation such as between a movable door and a stationary panel.

A further object of the invention lies in providing a panel edge assembly comprising such a panel formed with a groove along at least one of its edges and a structural member secured in the groove.

More specifically and as herein broadly claimed, the invention is an elongated one-piece structural member comprising: a rectilinear base having a flat bottom face and a top face; a base-dividing wall projecting from said top face centrally thereof; a pair of lateral wings converging, from the side edges of said base, toward said central wall and terminating short thereof; whereby said base, central wall and wings define a pair of outwardly open cavities each having a generally right angle trapezoidal contour in cross-section and extending along said base; and securing wall means projecting from said bottom face of said base.

The securing wall means aforesaid may comprise a further base dividing wall, projecting from the bottom face of the base and having tangs formed on its lateral faces, such tangs being turned toward the bottom face of the base.

A description of a preferred embodiment of the invention, with variants, now follows having reference to the appended drawing wherein:

FIG. 2 is an end view of the aforesaid structural member;

FIGS. 3 to 6 are end views of various key elements useable with the structural member of FIG. 2, and FIGS. 7 through 13 are cross-sectional views of various panel edge assemblies making use of the structural member of FIG. 2 and one or more of the key elements of FIGS. 3 to 6, the views being taken in planes along correspondingly numbered lines in FIG. 1.

FIG. 1 illustrates a cabinet wherein the various panels are interrelated, either being secured edgedly together or in edge facing relation.

Figure 1:
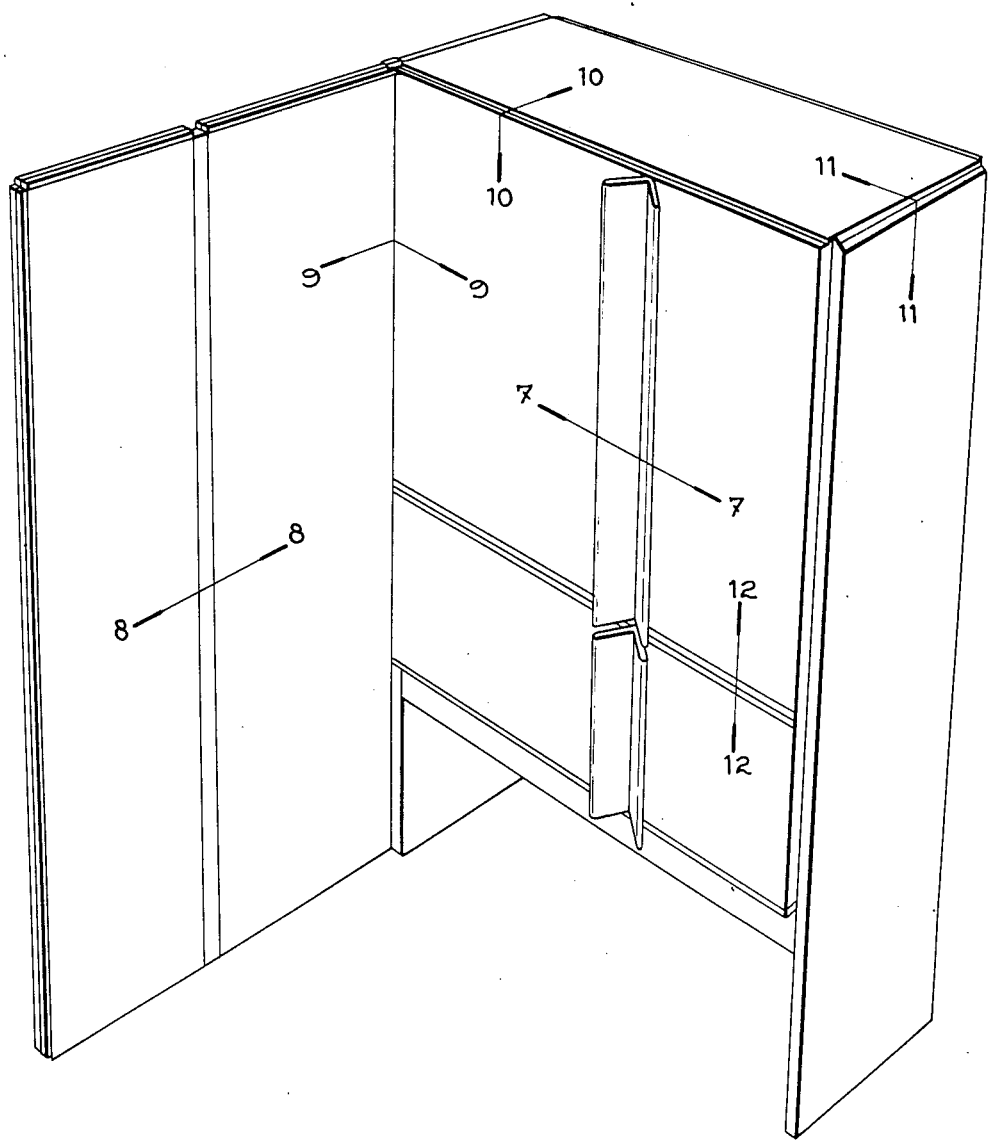
FIG. 1 is a perspective view of a typical cabinet made with panels structurally interrelated with a structural edge member according to the invention.

The basic structural member 1 which forms the present invention is shown, in an end view, in FIG. 2. It is typically made of extruded metal or plastic material so as to form a one-piece member and comprises an essentially flat rectilinear elongated base 3 having a flat bottom face 5 and a top face 7. A base-dividing wall 9 projects from and centrally of the top face 7. A pair of lateral wings 11 converge at 45°, toward the central wall 9 and terminate short of it so that the base 3, the central wall 9 and the wings 11 define therebetween a pair of outwardly open cavities 13 each having a generally right angle trapezoidal contour in cross-section and extending along the base 3. Conveniently, the top face 7 merges with the lateral wings 11 and the central wall 9 through arcuate surfaces 15, 15'. Advantageously also, the base 3 may terminate, laterally, with guiding flanges 17 projecting down from the bottom face 5.

The structural member 1 finally comprises securing means 19 projecting from the bottom face 5 of the base 3 for mounting the member 1 onto a panel edge, as will hereinafter be described. The securing means, as shown, may comprise a further dividing wall 21, projecting from the bottom face 5 coaxially with the other dividing wall 9, and having tangs 23 formed on its lateral faces, these tangs 23 being turned toward the bottom face 5 and being produced by serrations extending along the dividing wall 21.

Depending upon the use of the structural member 1, one or more cooperating keys may be used therewith that are shown in FIGS. 3 through 6.

The key 25 of FIG. 3 has an elongated body of essentially square cross-section although heavily rounded at three of its edges 27, the rounding of the central one of the edges being particularly accentuated. There is provided a blind diagonally-extending groove 29 which runs the full length of the key body 25, groove 29 opening outwardly of the body 25 but terminating short of its center. The junction between the mouth of the groove 29 and the adjoining faces of the key 25 is rounded. Its width equals twice the thickness of a lateral wing 11 of the structural member 1. As shown, the key 25 may be said to be somewhat kidney-shaped.

The key element 31 of FIG. 4 is also square in cross-section although the edges are less rounded than in the key element 25 of FIG. 3. The blind groove 29', which has a width equal to that of the wing 11 of the structural member of FIG. 2, also extends diagonally but on one side only of the corresponding diagonal line of the square cross-section.

The key element 33 of FIG. 5 has, in cross-section, the general outline of a right angle triangle formed of a base portion 35 and an apex portion 37. The base edges and the apex edge are also rounded. Formed between the base portion 35 and the apex portion 37, at the lower end of the hypotenuse, is a rabbet 39.

The last key element 41 is shown in FIG. 6 and, as will be appreciated by comparing it with the structural member 1 of FIG. 2, it is identical in cross-section except for the absence of the lateral flanges 17 and the securing wall means 19 present in the structural member 1.

Reference is now made to the various panel edge assemblies illustrated in FIGS. 7 through 13 showing the use of one or more of the key elements of FIGS. 3 through 6 in combination with the basic one-piece structural member 1 which is basic with the present invention.

Figure 7:
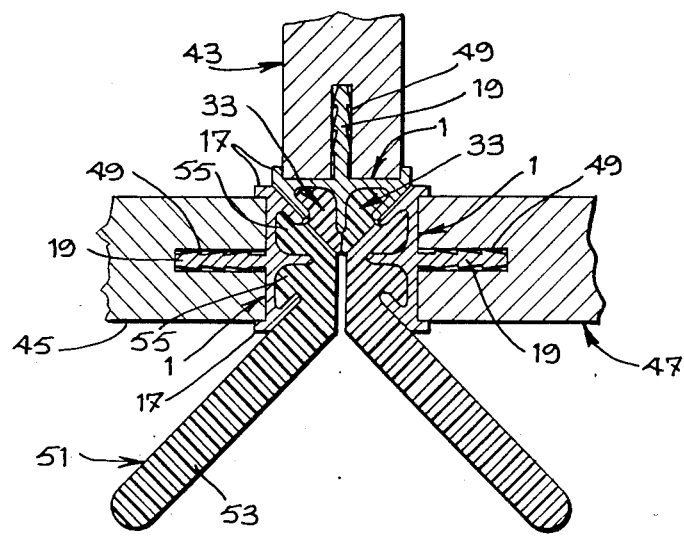

The assembly of FIG. 7 is that of a stationary partitioning panel 43 and two door panels 45 and 47 which can either be of the swinging or sliding type and of which the edges abut that of the partitioning panel 43. As shown, each panel is provided with a groove 49 into which the securing wall means 19 of the corresponding structural member 1 is pressed to be force-fitted therein, removal being prevented by the serrated configuration formed by the tangs 23. The flanges 17 then lie against the faces of the panels 43, 45 and 47. With respect to the structural member 1 of the stationary panel 43, a key 33 is mounted in each of its cavities 13.

The base portions 35 of these key elements 33 then slidably fit into the cavities while the apex portions 37 project out of the cavities, as shown.

Especially extruded parts 51 cooperate with the structural members 1 of the wall panels 45, 47. Each such extruded part 51 has a handle portion 53 that extend angularly relative to its respective panel, this handle portion 53 terminating inwardly with a pair of lobes 55 slidably lodging into the cavities 13 of the relevant structural member 1. Each such lobe 55 has generally the shape of the key element 33 of FIG. 5.

In the assembly aforedescribed, it will be appreciated that the door panels 45, 47, can be brought into and out of abutting engagement with the edge of the stationary panel 43.

Figure 8:
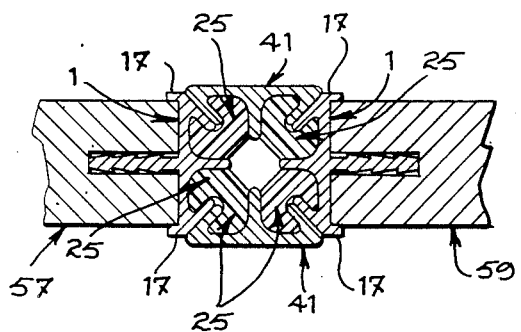

In the assembly shown in FIG. 8, two coaxial panels 57, 59, are secured together along facing edges by means of structural members 1 in cooperation with keys 41 of which the lateral converging walls abut the adjoining converging walls of members 1; a series of keys 25 of the type illustrated in FIG. 3 solidly holding the keys 41 against the structural members 1, as shown.

Figure 9:
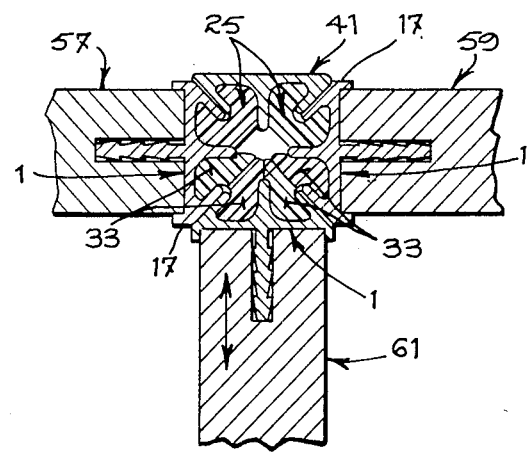

The assembly of FIG. 9 is a combination of the above FIGS. 7 and 8. In this assembly, panels 57, 59, are solidly fixed together by means of two structural members 1, one key element 41 and two lobed keys 25, much as in the connection of the two panels 57, 59 of FIG. 8. The third panel 61 and its edge is configured as the edge of panel 43 of FIG. 7. In this case, four triangular keys 33 are necessary.

The assembly of FIG. 10 is that between a top horizontal panel 65 and a vertical door panel 63. The relationship of the edges is therefore only a edge-abutting one and is therefore provided by key elements 33 of the FIG. 5 type. The remaining cavities of the structural members 1 may be filled with key elements 31, detailed in FIG. 4.

The assembly of FIG. 11 is also that of a corner connection but in this case the two panels 67, 69, are solidly held together by means of a kidney-shaped key element 25, FIG. 3. The remaining cavities of the structural member 1 may be filled with keys 33 of the triangular type.

The assembly of FIG. 12, which may be between the bottom edge of a swinging door and the top edge of a drawer, is identical to that of FIG. 8 except that all key elements are independent of one another and are of the type 31 shown in FIG. 4.

The final edge assembly of FIG. 7 shows again the use of the basic structural members 1 secured to the edge of a swinging door panel 67 and of a stationary bottom panel 69, the latter being mounted at the top of a furniture base leg support 71. The latter has, at the top thereof, a specially profiled member 73 defining a lobe 75 capable of being slidably lodged into the bottom cavity 13 of the structural member 1 at the edge of the bottom panel 69. The two cavities of the structural element 1 of the swinging door panel 67 are, on the other hand, respectively filled with a square key element 31 (FIG. 4) and a triangular key element 33 (FIG. 5).

The above-described various assemblies clearly illustrate that the single basic structural member 1 of the invention can be fit with various key elements in a manner suitable to achieve the various types of joints susceptible of being encountered in cabinet-making and this at an appreciably low cost and with great ease.

We claim:
1. A panel edge assembly comprising:
   a panel with an outwardly open groove extending along one edge thereof;
   an elongated one-piece structural member secured to said panel edge and comprising:
      a rectilinear base having a flat bottom face, a top face and parallel side edges;
      a first straight rigid base-dividing wall projecting perpendicularly from said top face centrally between said edges of said base, said first base-dividing wall having a generally constant cross-sectional width;
      a pair of lateral wings projecting from said side edges of said base at an angle with respect thereto and turned toward said first base-dividing central wall, each wing having essentially parallel inner and outer faces and terminating short of said first base-dividing wall, whereby said first base-dividing central wall, said wings and the portions of said base between said central wall and said wings define therebetween a pair of like outwardly open cavities each of which has a generally right angle trapezoidal contour in cross-section with the wide base thereof running along said rectilinear base of said structural member, the narrow bases of said trapezoidal cavities extending between the tips of said wings and said central wall;
   a second base-dividing wall projecting from said bottom face of said base coaxially with said first base-dividing wall, and
   means force-fittingly securing said second base-dividing wall into said groove of said panel edge with said bottom face of said base flatly engaging said panel edge.

2. An assembly as claimed in claim 1, further comprising a first key element comprising: an elongated body having an essentially square cross-section and a blind diagonally-extending groove running the full length of said body, said groove opening outwardly of said body and terminating short of the center thereof; said first key element being in sliding engagement with said structural member with a portion of said first key element located on one side of said groove being snugly housed into one of said cavities of said structural member.

3. An assembly as claimed in claim 2, further comprising a second key element including:
   a rectilinear base having a flat bottom face, a top face and parallel side edges;
   a first straight rigid base-dividing wall projecting perpendicularly from said top face centrally between said side edges of said base, said first base-dividing wall having a generally constant cross-sectional width;
   a pair of lateral wings projecting from said side edges of said base at an angle with respect thereto and turned toward said first base-dividing central wall, each wing having essentially parallel inner and outer faces and terminating short of said first base-dividing wall, whereby said first base-dividing central wall, said wings and the portions of said base between said central wall and said wings defining therebetween a pair of like outwardly open cavities each of which has a generally right angle trapezoidal contour in cross-section with the wide base thereof running along said rectilinear base of said second key element, the narrow bases of said trapezoidal cavities extending between the tips of said wings and said central wall;

wherein one of said lateral wings of said second key element abuts an adjoining lateral wing of said structural member;

wherein both of said abutting lateral wings are snugly housed in said blind groove of said first key element, and wherein the other portion of said first key element on the other side of said blind groove is snugly housed into said cavity of said second key element adjacent said one of said lateral wings of said second key element.

4. An assembly as claimed in claim 1, further comprising a first key element comprising: an elongated body having an essentially square cross-section and a blind diagonally-extending groove running the full length of said body, said groove opening outwardly of said body and terminating short of the center thereof; said first key element being in sliding engagement with said structural member with a portion of said first key element located on one side of said groove being snugly housed into one of said cavities of said structural member, said blind groove having a width dimensioned for snug fitting over said wing of said structural member defining, in part, said one of said cavities.

5. An assembly as claimed in claim 1, wherein said lateral wings make an angle of 45° with said base.

* * * * *